United States Patent
Zhou et al.

(10) Patent No.: US 9,792,940 B2
(45) Date of Patent: Oct. 17, 2017

(54) HIGH SAMPLE RATE DPES TO IMPROVE CONTACT DETECTION SIGNAL TO NOISE RATIO

(71) Applicant: Seagate Technology LLC, Cupertino, CA (US)

(72) Inventors: Lin Zhou, Eagan, MN (US); Juil Lee, Eden Prairie, MN (US); Dongming Liu, Eden Prairie, MN (US); Huazhou Lou, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 643 days.

(21) Appl. No.: 13/840,962

(22) Filed: Mar. 15, 2013

(65) Prior Publication Data

US 2014/0269241 A1    Sep. 18, 2014

(51) Int. Cl.
*G11B 5/60* (2006.01)

(52) U.S. Cl.
CPC ............ *G11B 5/607* (2013.01); *G11B 5/6076* (2013.01)

(58) Field of Classification Search
CPC ......... G11B 5/581; G11B 5/60; G11B 5/6076; G11B 5/58; G11B 11/10576; G11B 15/62; G11B 17/32; G11B 21/21
USPC .............. 360/75, 69, 230, 234, 234.3, 237.1
See application file for complete search history.

(56) References Cited

U.S. PATENT DOCUMENTS

| | | | |
|---|---|---|---|
| 7,038,875 B2 * | 5/2006 | Lou | G11B 5/012 360/75 |
| 7,190,547 B2 | 3/2007 | Khurshudov | |
| 7,349,170 B1 * | 3/2008 | Rudman | G11B 5/6005 360/31 |
| 7,508,618 B1 | 3/2009 | Herbst | |
| 2007/0268605 A1 | 11/2007 | Ryu | |
| 2008/0013201 A1 | 1/2008 | Alexander | |
| 2008/0123210 A1 | 5/2008 | Zeng | |
| 2008/0204924 A1 * | 8/2008 | Ohno | G11B 5/6029 360/75 |
| 2009/0116135 A1 | 5/2009 | Yeakley | |
| 2009/0147390 A1 | 6/2009 | Tang | |
| 2010/0033861 A1 | 2/2010 | Fry | |
| 2010/0177429 A1 | 7/2010 | Lee | |
| 2012/0212851 A1 * | 8/2012 | Goldberg | G11B 5/6076 360/46 |
| 2013/0148230 A1 * | 6/2013 | Jin | G11B 27/36 360/55 |

* cited by examiner

*Primary Examiner* — Thomas Alunkal
(74) *Attorney, Agent, or Firm* — Faegre Baker Daniels LLP (57) ABSTRACT

Using a high sample rate dPES, together with pulsed heater and lock-in technique, to improve dPES SNR for contact detection between the head and media surface. Steps of powering a transducing head actuator with pulsed input signal at a select data track offset from a previously-written to data track of the storage medium, where the pulsed input signal has select amplitude and duty cycle to simulate a response signal, and further locking in an amplitude with respect to the heater frequency, can lead to a determination of level of heater power for initiating contact between the transducing head and the storage medium.

17 Claims, 6 Drawing Sheets

HIGH SAMPLE RATE DPES TO IMPROVE CONTACT DETECTION SIGNAL TO NOISE RATIO

BACKGROUND

Data storage devices, such as disc drives, generally utilize slider heads each of which carries a transducer for reading and writing data to storage media, such as discs, housed in the devices. In the case of disc drives, the slider heads hover over the discs at a fly height as the disc is rotated underneath. With continual increases being made in the recording density of storage media, there has been corresponding demand for fly height of the slider heads to be reduced, which would enable more data to be recorded to and read from the heads. However, because of media surface irregularities and operational conditions, decreased fly heights can lead to detrimental contact between transducer and media. Consequently, clearance measurement has become critical for both component and drive clearance setting. For example, microactuators (such as writer heaters) positioned in the slider head have become an important tool in actively controlling clearance between transducer and media, known as head to media spacing (HMS).

Generally, in activating a writer heater, a protrusion thereof is drawn close toward the media surface until contact is made. Following such contact, the HMS can be varied by correspondingly varying the power to the heater. Ideally, one is looking to provide just enough power to the heater so that the protrusion barely contacts the media surface. In turn, friction between the head and media can be minimized so as to not adversely affect future functioning of the transducer. However, if too much power is used, greater friction between the head and media results, which can lead to signal errors during future reading/recording of the transducer.

Thus, a primary concern for active clearance control is reliable and wear-free contact detection. To date, two types of contact detection schemes used in data storage device calibrations have involved (i) detecting off-track signal by measuring change in position error signal (dPES), which results from friction between the head and the contacted media and (ii) detecting modulation from the head-to-media contact.

However, these schemes for detecting contact stand to be improved.

SUMMARY

A method is provided of using a high sample rate dPES, together with pulsed heater and lock-in technique, to improve dPES SNR for contact detection between the head and media surface. Steps of powering a transducing head actuator with pulsed input signal at a select data track offset from a data track of the storage medium previously written to, where the pulsed input signal has select amplitude and duty cycle to simulate a response signal, and further locking in an amplitude with respect to the heater frequency, leads to a determination of level of heater power for initiating contact between the transducing head and the storage medium.

Other features and benefits that characterize embodiments of the present invention will be apparent upon reading the following detailed description and review of the associated drawings.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. Those skilled in the art will recognize that many of the examples provided have suitable alternatives that can be utilized.

As alluded to above, dPES has generally been used for detecting contact between slider heads and media, both in component and drive testing. The position error signal (PES) is a signal that indicates the radial position of the transducer with respect to the tracks on a rotatable storage medium. In high performance data storage devices, the PES is derived from either a prerecorded servo disc with a corresponding servo head (a dedicated servo system), or from servo information that is embedded on each recording surface among user data blocks at predetermined intervals (an embedded servo system). The slider head provides the servo information to servo control circuitry which generates the PES with a magnitude that is typically equal to zero when the head is positioned over the center of a track ("on track"), and is linearly proportional to a relative off-track distance between the head and the center of the track. For example, in component level clearance testing, which involves the so-called CHIRP (Clearance from Heater-Induced Reader Protrusion) test, off-track motion is calculated from the read-back intensity of three sequentially written data tracks with slight radial offsets.

Figure 1:
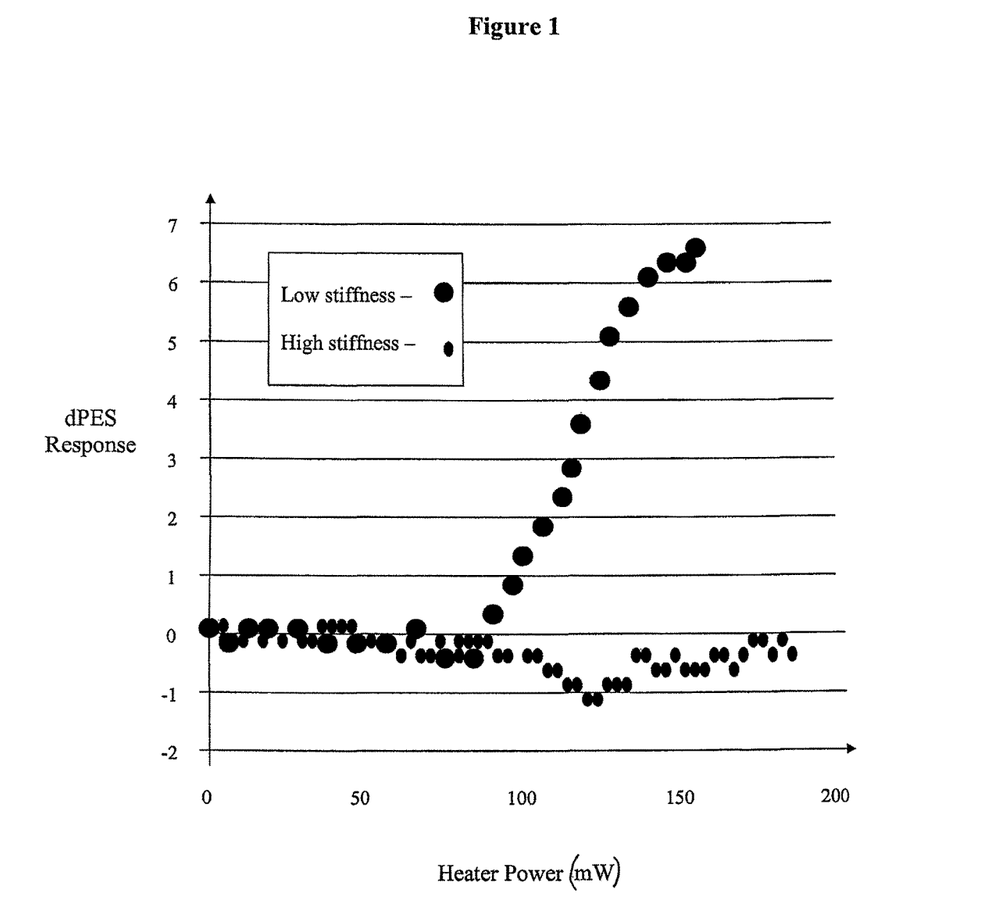
FIG. 1 is an exemplary plot showing dPES response as it relates to varied heater power for differing stiffness pressures of a head armature.

In reducing HMS, some methods have also involved reducing contact modulation. For example, one way to achieve low modulation is to increase air bearing stiffness/pressure of the armature that supports the head. One favorable side effect of increasing the air bearing stiffness/pressure is that the HMS can be more affirmatively maintained. However, at the same time, dPES response, stemming from friction between the head and media and causing the head to pull away from the track of the media it runs along, is reduced. This decrease in dPES response brings difficulty to the process of contact detection. In brief, the position of the head is maintained generally parallel to the armature, with no dPES being measured regardless of the amount of power output from the heater protrusion. Such phenomenon of dPES response as it relates to varied heater power for differing stiffness pressures of the armature is demonstrated in the plot of FIG. 1. As such, it is difficult to accurately locate the dPES turning point, i.e., the point at which dPES response spikes, for air bearing armature having high stiffness, which also leads to poor recognition of signal to noise ratio (SNR).

Embodiments of the disclosure provide using a high sample rate dPES, together with pulsed heater/actuator and lock-in technique, to improve dPES SNR for contact detection between the head and media surface. Such a head-to-media contact detection scheme can also be used when a data storage device is being calibrated. In certain embodiments, the contact detection scheme involves initially writing a single data track, as compared to the conventional process of sequentially writing multiple data tracks with radial offsets. In only requiring a single-written data track and using such for subsequent steps of the process, the process can be performed more efficiently with reduced potential error stemming from conclusions being drawn from other tracks.

Figure 2:
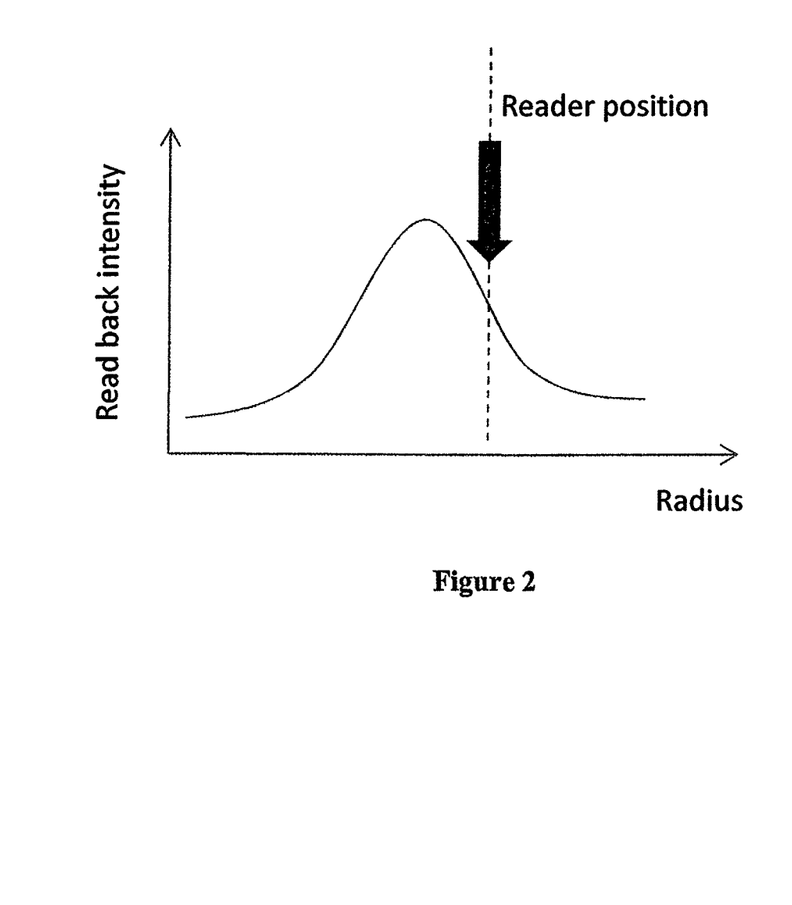
FIG. 2 is an exemplary curve showing read-back intensity versus data track radius for a cross-data track scan, with reader position at one "shoulder" of the curve being further exemplified, according to some embodiments.
Figure 3:
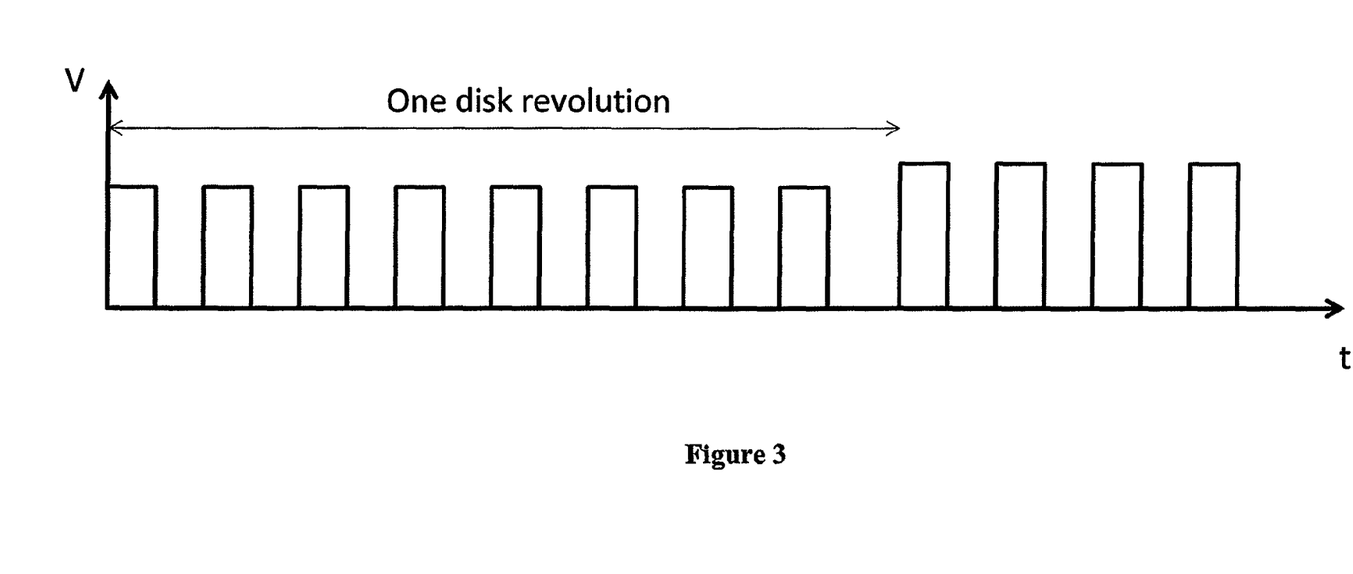
FIG. 3 is exemplary graph showing pulsed power being applied to the heater or other actuator at differing amplitudes for providing modulated friction on a reader head and corresponding signal noise that would stem there from, according to some embodiments.

As described above, in certain embodiments, a single data track is written to. Following a cross-track scan, whereby read back intensity is measured for varied radius from the single-written data track, the reader is subsequently positioned at one "shoulder" of the intensity curve so as to maximize off-track sensitivity measurements. An exemplary curve showing read-back intensity versus track radius for a cross-track scan is shown in FIG. 2, with reader position at one "shoulder" of the curve being further exemplified. In certain embodiments, this position of the reader (at one shoulder) can be at an offset on the curve (stemming from the cross-track scan) whereby 50% of maximum read-back intensity is found; however, this is but one example of reader position. At such reader position, in certain embodiments and as illustrated in FIG. 3, the heater is powered at pulsed amplitude, e.g., square voltage wave, and at a set frequency, e.g., 1 kHz, and duty cycle, e.g., 50%, to simulate full heater stroke. As such, a modulated friction force is generated at the offset reader position. In certain embodiments, when using the above-described power constraints for the reader, the pulsed power wave is varied over multiple power steps, e.g., each comprising one revolution of the disk, to provide further sampling with regard to the modulated friction, and corresponding signal noise that would stem there from. This is exemplarily shown in FIG. 3.

When powering the reader as described above, the reader amplitude is sampled at a frequency that is higher than the frequency of the heater. In certain embodiments, this sampling frequency is at least 4 times higher than the heater frequency, e.g., 1 MHz. As a result, such higher sampling rate helps focus in on the lock-in noise that specifically stems from the heater as it is powered. Particularly, in certain embodiments, the reader amplitude is subsequently locked-in to the heater frequency so as to enable rejection of any noise not attributed from the heater position. As further detailed below, such noise can be rejected using one or both of hardware, e.g., a lock-in amplifier, or software, e.g., a lock-in algorithm.

For example, in certain embodiments, the lock-in amplitude of the reader can be plotted against the heater power. An exemplary plot of such is provided in FIG. 4. As shown, the generated curve (shown as solid line "A" or "B" in FIG. 4) is found to "break off" from the expected continuation of the curve (shown as dashed line "C"). Such "break off" is representative of the turning point of the reader due to SNR, signaling contact detection. For example, the generated curve may be found to turn upward (as exemplified with solid line "A") or downward (as exemplified with solid line "B") from such expected continuation (dashed line "C"), depending on off-track motion of the reader, either toward or away from the data track, respectively.

It should be appreciated that the measured lock-in amplitude is a mixture of HIRP (Heater-Induced Reader Protrusion) response and reader amplitude change resulting from the off-track motion. As is known, the HIRP response is an unwanted component of such lock-in amplitude. In certain embodiments, the HIRP component can be removed by subtracting it via use of a further HIRP curve obtained following the same writing, scanning, and sampling steps as described above, but with the reader positioned at the top of the cross-track intensity curve, instead of at a "shoulder" thereof as illustrated with reference to FIG. 2. In such case, the resulting difference between the HIRP curves pinpoints a dPES turning point, signaling contact detection yet without noise component.

Figure 4:
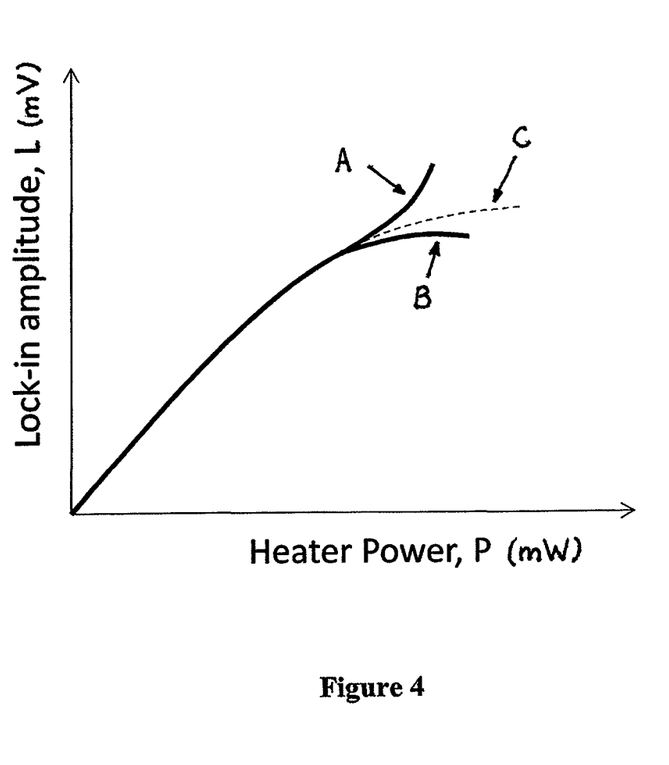
FIG. 4 is an exemplary plot showing lock-in amplitude versus heater power and alternate turning points for the amplitude as a consequence of HIRP response and off-data track motion, according to some embodiments.
Figure 5:
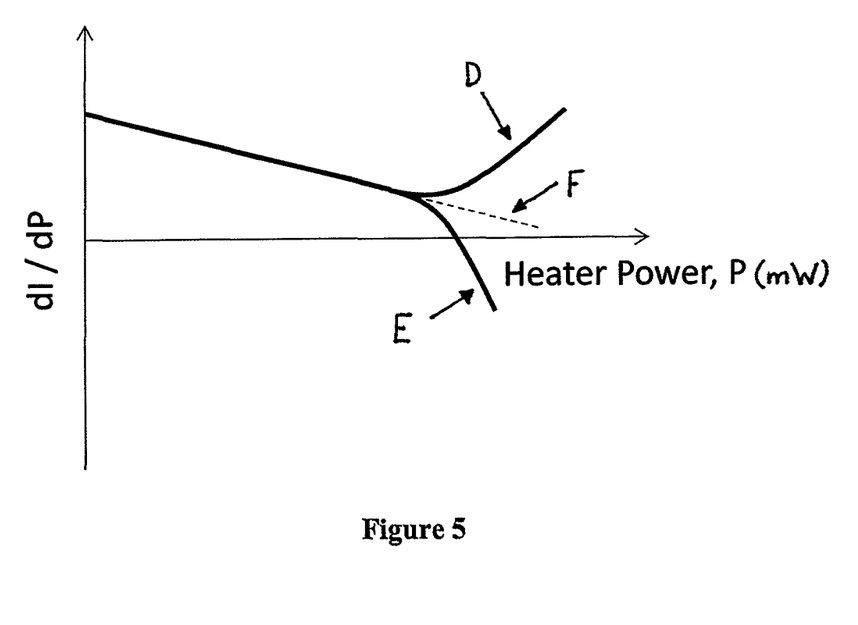
FIG. 5 is an exemplary plot showing similar relationship as in FIG. 4, but with a derivative of the lock-in amplitude being alternately used, according to yet further embodiments.

In other certain embodiments, a derivative can be taken of the curve of FIG. 4. As the HIRP curve is close to $2^{nd}$ order polynomial, the derivative of HIRP will be close to linear, whereby a turning (or transition) point therefrom also indicates contact detection. An exemplary plot showing this relationship is provided in FIG. 5. As shown, the generated curve (shown as solid line "D" or "E" in FIG. 5) is found to "break off" from the expected continuation of the curve (shown as dashed line "F"). Similar to that described above with reference to FIG. 4, such "break off" is representative of the turning point of the reader due to SNR, signaling contact detection.

Alternately, the HIRP component can be removed by again following the same subtracting method as described above, but with the reader positioned at the opposing "shoulder" (on the opposite side of the cross-track intensity curve). In such case, by subtracting the lock-in amplitude measurements made at the two shoulders (or two tracks offset from the previously-written to track) for the same variations in heater power, the difference showing the smallest non-zero value characterizes initial contact between the transducing head and the storage medium. In turn, such value also corresponds to level of heater power for providing the initial contact between the transducing head and the storage medium.

In certain embodiments, a lock-in algorithm can be used in conjunction with the above process in order to reject any noise other than attributable from the heater position. Such algorithm can be used to detect the signal amplitude at certain frequencies. In general, the signal will be provided as a combination of noise component and signal component, as follows:

$$I = \Sigma(A_i \sin(\omega_i t + \varphi_i)) + (A_0 \sin\omega_0 t + \varphi).$$

$$\phantom{I = }\text{noise} \phantom{(A_i \sin(\omega_i t + \varphi_i)) + (}\text{signal}$$

With an artificial signal for the reader position at the "shoulder" of the cross-track intensity curve represented by the following:

$$I_r = \sin(\omega_0 t + \phi_0), \text{ where } \phi_0 \text{ is equal to } \phi,$$

the $I \times I_r$ product reduces to an amplitude of $-A_0/2$ multiplied by an AC signal component of $(\cos(2\omega_0 t + \phi_0 + \phi))$ and a DC signal component of $-1$, as follows:

$$I \times I_r = -A_0/2((\cos(2\phi_0 t + \phi_0 + \phi)) - 1).$$

In certain embodiments, a low pass filter can be used in removing the AC signal component, so the remainder signal component is $A_0/2$; however, it should be appreciated that other alternate signal processing components can be alternately used in securing the same reminder signal. To that end, in certain embodiments, the underlying circuit design can involve a locking amplifier and low pass filter, or a digital locking amplifier, with such being well known and commercially available.

Figure 6:
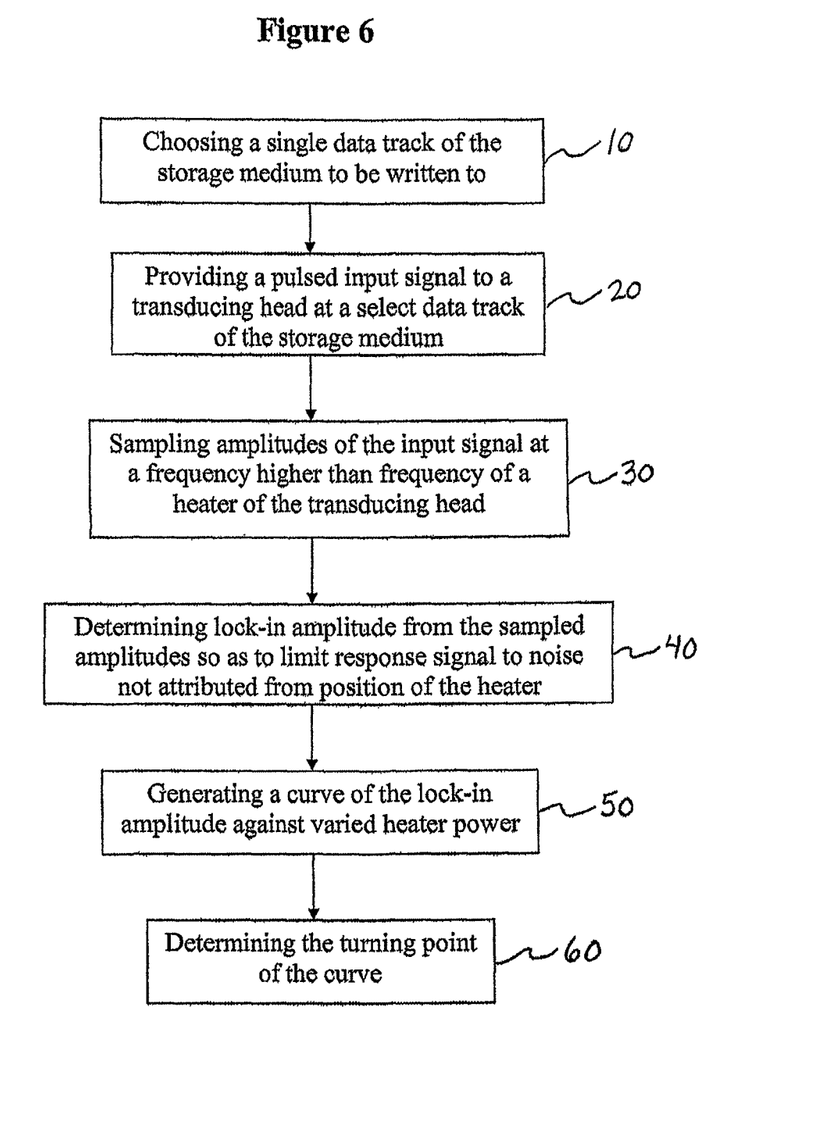
FIG. 6 is a flowchart showing steps for contact detection process, according to some embodiments.

FIG. 6 is a flowchart showing exemplary steps for a contact detection process according to certain embodiments of the invention. The process, as described above and provided in step 10, involves choosing a single data track of the storage medium to be written to. Step 20 involves providing a pulsed input signal to a transducing head actuator at a select data track of the storage medium, with the select data track being offset from the single data track of the storage medium previously written to, and the input having a select amplitude and duty cycle, e.g., 1 kHz, and duty cycle, e.g., 50%, to simulate a response signal (with modulated friction) at the select data track. As described above, in certain embodiments, such select data track is selected as a "shoulder" on a cross scan of the storage medium surface for read back intensity in relation to the single data track. Step 30 involves sampling amplitudes of the input signal at a frequency higher than frequency of a heater of the transducing head. As described above, in certain embodiments, the sampling frequency is at least 4 times higher than the heater frequency, e.g., 1 MHz. Step 40 involves determining lock-in amplitude from the sampled amplitudes so as to limit response signal to noise not attributed from position of the heater, and step 50 involves generating a curve of the lock-in amplitude against varied heater power. From the curve, a turning point can be observed, where the turning point comprises a point at which curve initially deviates from what is expected (e.g., abrupt curving upward or downward from general shape of the curve). Step 60 involves determining the turning point of the curve, whereby the initial deviation point of the curve characterizes the initial contact between the transducing head and the storage medium, and in turn, corresponds to the level of heater power for providing such initial contact between the transducing head and the storage medium.

It should be appreciated that the turning point can be further isolated through various methods of repeating steps 20-50 with the previously written-to data track and then differentiating its curve from the curve obtained from the select offset track (e.g., as described above with regard to positioning the reader at the top of the cross-track intensity curve, instead of at a "shoulder" thereof as illustrated with reference to FIG. 2). Alternately, steps 20-50 can be repeated with a corresponding opposing "shoulder" (and corresponding data track of the storage medium) of the read-back intensity curve, and differentiating that curve and the curve from the other "shoulder." Further, derivatives of one or more of the above-described curves can be taken to provide for near linear curves, enabling their turning points to be more distinguishable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of detecting initial contact between a transducing head and a storage medium, the method comprising:
   providing a pulsed input signal to an actuator of the transducing head, wherein a sampling frequency of the input signal is at least four times higher than a heater frequency;
   sampling amplitudes of the input signal;
   determining a lock-in amplitude from the sampled amplitudes, wherein the lock-in amplitude is determined through use of an algorithm with respect to the response signal at the sampled amplitudes;
   generating a curve of the lock-in amplitude against varied heater power; and
   determining a turning point of the curve.

2. The method of claim 1 wherein the turning point corresponds to level of heater power for providing the initial contact between the transducing head and the storage medium.

3. The method of claim 1, wherein the actuator comprises a heater, the method further comprising steps of:
   performing a cross scan of a surface of the storage medium with regard to read back intensity in relation to a single data track;
   performing at single data track steps of:
      providing a pulsed input signal to the heater of the transducing head,
      sampling amplitudes of the input signal at a frequency higher than frequency of the heater of the transducing head,
      determining a lock-in amplitude from the sampled amplitudes so as to limit response signal to noise not attributed from position of the heater, and
      generating a curve of the lock-in amplitude against varied heater power; and
   differentiating the curve generated for the select data track and the curve generated for the single data track in determining the turning point.

4. The method of claim 3 wherein the read back intensity is measured for varied radius of the storage medium from the single data track during the cross scan.

5. The method of claim 3 wherein the read back intensity at the select data track is less than the read back intensity at the single data track, enabling the response signal at the select data track to be simulated from full heater stroke.

6. The method of claim 1 further comprising a step of taking a derivative of the curve, resulting in a further curve that is near linear with the turning point being more distinguishable on the further curve.

7. The method of claim 1 wherein a sampling frequency of the input signal is at least 1 MHz.

8. The method of claim 1 wherein the algorithm processes both noise and signal components of the response signal, the response signal having both AC and DC components, and wherein the AC component is subsequently removed.

9. The method of claim 8 wherein the AC component is removed via a low pass filter.

10. The method of claim 8 wherein the AC component is removed via a digital locking amplifier.

11. A method of determining heater power requisite to initiate contact between a transducing head and a storage medium, the method comprising:
  powering a heater of the transducing head with pulsed input signal at a select data track of the storage medium, the pulsed input signal having select amplitude and duty cycle to simulate a response signal at the select data track, the select data track being offset from a single data track of the storage medium previously written to;
  sampling amplitudes of the input signal at a frequency higher than frequency of the heater;
  determining a lock-in amplitude from the sampled amplitudes;
  generating a curve of the lock-in amplitude against varied heater power; and
  determining a turning point of the curve.

12. The method of claim 11 further comprising steps of:
  performing a cross scan of a surface of the storage medium with regard to read back intensity in relation to the single data track;
  performing at the single data track steps of:
    powering the heater of the transducing head with pulsed input signal,
    sampling amplitudes of the input signal at a frequency higher than frequency of the heater of the transducing head,
    determining a lock-in amplitude from the sampled amplitudes so as to limit response signal to noise not attributed from position of the heater, and
    generating a curve of the lock-in amplitude against varied heater power; and
  differentiating the curve generated for the select data track and the curve generated for the single data track in determining the turning point.

13. The method of claim 12 wherein the read back intensity at the select data track is less than the read back intensity at the single data track, enabling the response signal at the select data track to be simulated from full heater stroke.

14. The method of claim 11 further comprising a step of taking a derivative of the curve, resulting in a further curve that is near linear with the turning point being more distinguishable on the further curve.

15. The method of claim 11 wherein the lock-in amplitude is determined through use of an algorithm with respect to the response signal at the sampled amplitudes.

16. The method of claim 15 wherein the algorithm processes both noise and signal components of the response signal, the response signal having both AC and DC components, and wherein the AC component is subsequently removed.

17. The method of claim 11, wherein the pulsed input signal simulates a response signal with modulated friction.

* * * * *